United States Patent [19]

Kim

[11] Patent Number: 5,298,979
[45] Date of Patent: Mar. 29, 1994

[54] AUTOMATIC DIGITAL WHITE-BALANCING CIRCUIT UTILIZING MEMORY ADDRESSES TO DETERMINE WHERE WHITE-BALANCE CORRECTION IS NECESSARY

[75] Inventor: Sung H. Kim, Suweon, Rep. of Korea

[73] Assignee: SamSung Electronics Co., Ltd., Sowun, Rep. of Korea

[21] Appl. No.: 804,735

[22] Filed: Dec. 11, 1991

[30] Foreign Application Priority Data

Dec. 31, 1990 [KR] Rep. of Korea .............. 90-23084

[51] Int. Cl.[5] .............................................. H04N 9/73
[52] U.S. Cl. ...................................... 348/655; 348/223
[58] Field of Search ................ 358/29, 29 C, 30, 41; H04N 9/73, 9/73 C

[56] References Cited

U.S. PATENT DOCUMENTS 4,562,459  12/1985  Sokei .................. 358/29 C

FOREIGN PATENT DOCUMENTS

| 0429992 | 6/1991 | European Pat. Off. .... H04N 9/73 C |
| 0454175 | 10/1991 | European Pat. Off. ....... H04N 9/73 |
| 0060088 | 3/1989 | Japan .......................... H04N 9/73 C |
| 0060090 | 3/1989 | Japan .......................... H04N 9/73 C |
| 0112887 | 5/1989 | Japan .......................... H04N 9/73 C |

Primary Examiner—Victor R. Kostak
Assistant Examiner—Jeffrey S. Murrell
Attorney, Agent, or Firm—Robert E. Bushnell

[57] ABSTRACT

An automatic digital white-balancing circuit comprises multipliers, a color difference matrix, an encoder sampling part, a integrating memory part, a comparing part, and a microcomputer, wherein the multipliers multiply color separated digital signals by multiplying coefficients applied from the microcomputer, the sampling part samples Y signals and R−Y and B−Y color difference signals of the matrix part, the integrating memory part integrates the output data from the sampling part and stores in the memory, and the comparing part decides whether the integrated data is included in a white balance adjusting region. Thus, the white balance can be adjusted even in a digital video camera as well as in an analogue video camera.

14 Claims, 5 Drawing Sheets

AUTOMATIC DIGITAL WHITE-BALANCING CIRCUIT UTILIZING MEMORY ADDRESSES TO DETERMINE WHERE WHITE-BALANCE CORRECTION IS NECESSARY

FIELD OF THE INVENTION

The present invention relates to an automatic digital white-balancing circuit for automatically adjusting white balance based on a digital method for processing a digital signal in a video camera.

BACKGROUND OF THE INVENTION

There has been developed an automatic white-balancing circuit for a video camera for processing analogue signals, and such a circuit has been put to practical uses. However, even though the adjustment of white balance in the video camera is indispensable for processing digital signals, the automatic white-balancing circuit for processing the digital signals has not been developed so far due to numerous difficulties during the processing of photographed video signals to the digital signals.

SUMMARY OF THE INVENTION

The present invention is intended to overcome the above described difficulties in the conventional technique.

Therefore, it is an object of the present invention to provide an automatic digital white-balancing circuit for a video camera for processing digital signals in which white balance can automatically be adjusted so as to enable a manufacturer to effectively manufacture a digital video camera.

In order to achieve the above object, the automatic digital white-balancing circuit according to the present invention comprises a sampling part for sampling Y signals and R−Y, B−Y color differences signals from a color difference matrix by properly sampling frequencies after receipt of the separated R, G, B signals, an integrating memory for integrating data sampled by the sampling part summing up and storing the data corresponding to a picture evaluation, comparing means for deciding whether the integrated input data from the integrating memory part is included in a white balance adjusting region, and a white balance adjusting part received the decided signals from the comparing part by a MICOM (microcomputer) for comparing the data read out from designated addresses of the integrating memory part and for providing multiplying coefficients to multipliers.

BRIEF DESCRIPTION OF THE DRAWINGS

The above object and other advantages of the present invention is apparent by describing in detail the preferred embodiment of the present invention with reference to the attached drawings, in which.

DETAILED DESCRIPTION OF THE PREFERRED EMBODIMENT

Figure 1:
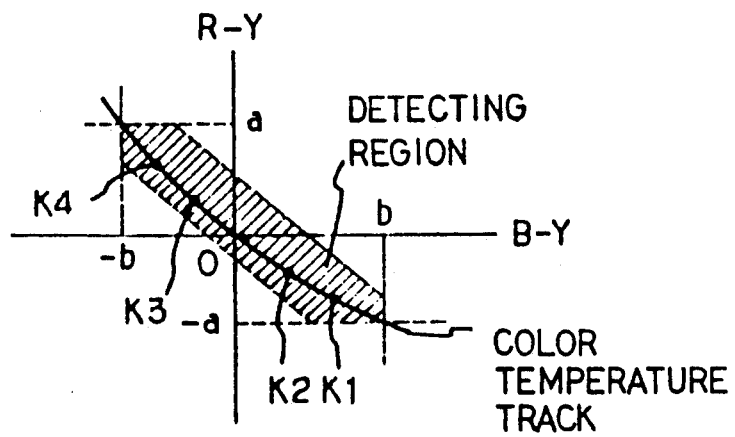
FIG. 1 is a graph showing a color-temperature track and a white detecting region according to the present invention.
Figure 2:
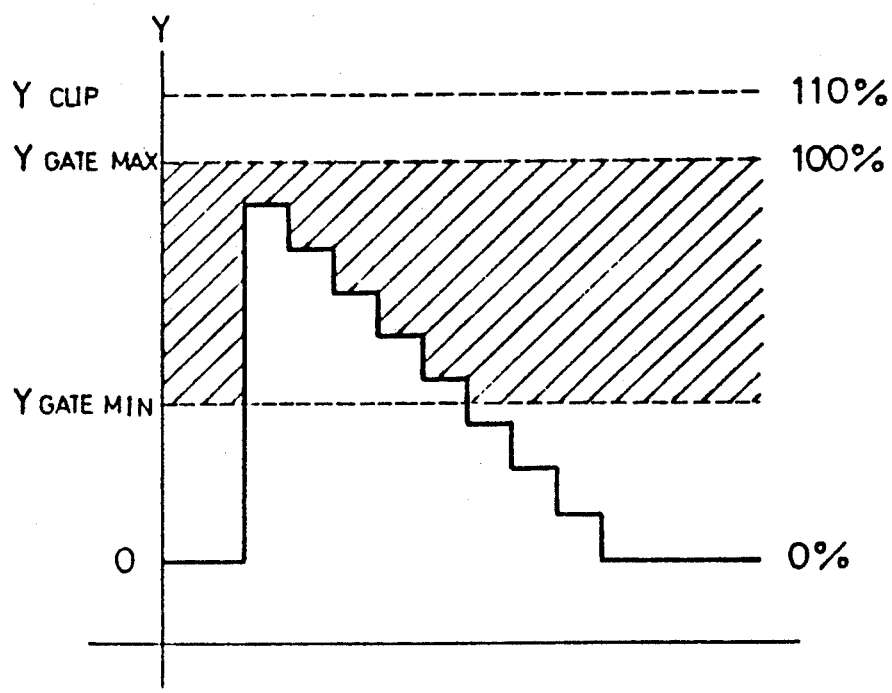
FIG. 2 is a graph showing the detection of luminance signals for obtaining a detecting region according to the present invention.
Figure 3:
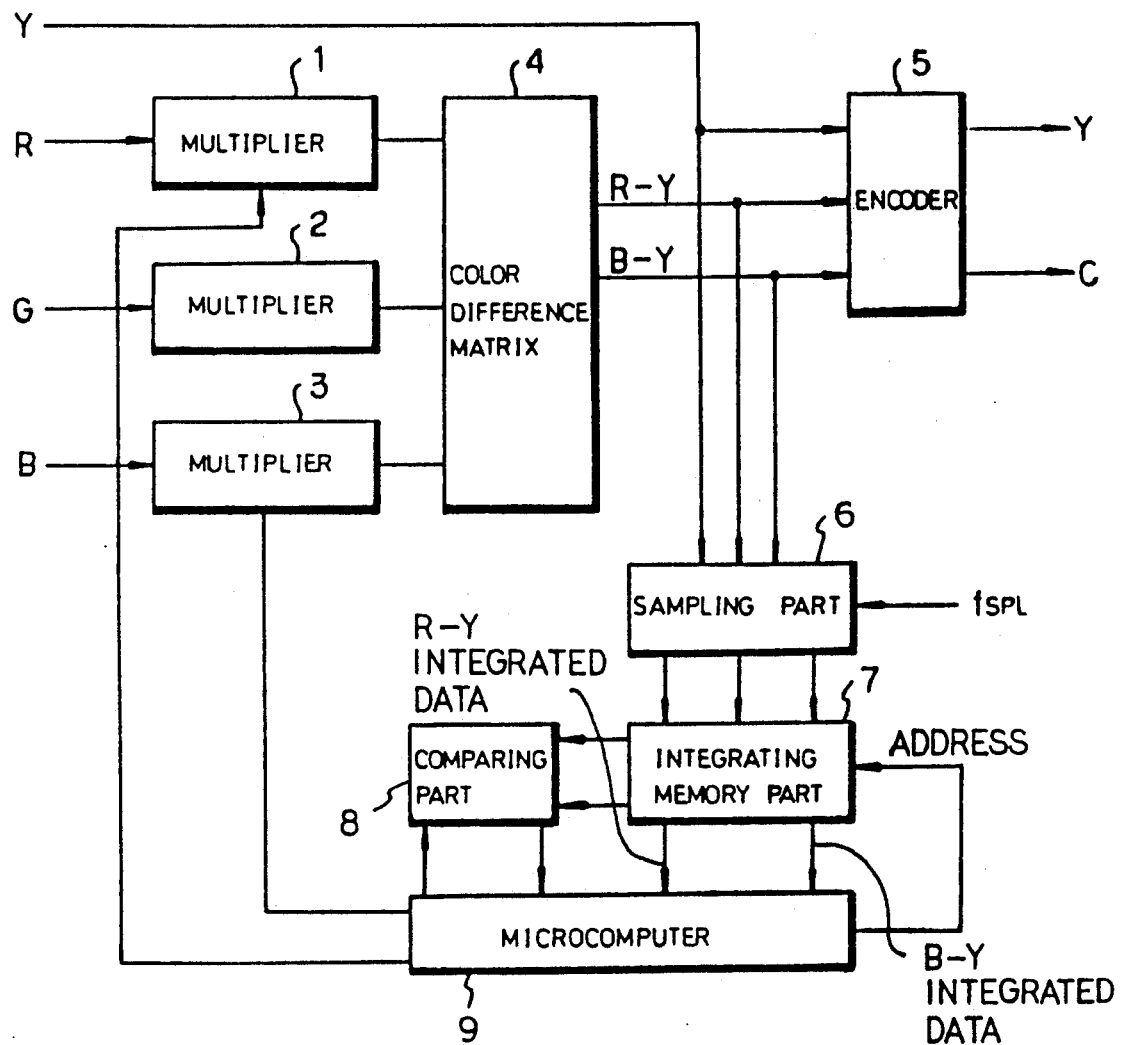
FIG. 3 illustrates an automatic digital white-balancing circuit according to the present invention.

FIG. 1 is a graph showing a color-temperature track and a white detecting region according to the present invention, and FIG. 2 is a graph showing the detection of a luminance signal at a predetermined level for obtaining the detecting region as shown in FIG. 1. FIG. 3 illustrates the circuit according to the present invention wherein the circuit comprises three separated multipliers 1,2,3 for multiplying color-separated R,G,B digital signals with corresponding multiplying coefficients provided from a MICOM 9, a color difference matrix 4 for combining a luminance signal and the output of the multipliers 1,2,3 to provided R−Y, B−Y color difference signals, an encoder 5 for encoding the luminance signal and the R−Y, B−Y color difference signals from the color difference matrix 4 to provide the luminance signal and the C chrominace signals, a sampling part 6 for sampling the Y luminance signal and the R−Y, B−Y color difference signals from the color difference matrix 4 to a proper sampling frequency f SPL, an integrating memory part 7 for integrating and computing output data from the sampling part 6 to store the output data into the respective addresses of the memory corresponding to a picture division, a comparing part 8 for deciding whether the integrated data of the integrating memory part 7 is included in a white balance adjusting region, and a MICOM 9 programmed for designating addresses within the integrating memory part 7 according to the decided signal from the comparing part 8 to apply white balance adjusting multiplying coefficients to the multipliers 1,2,3 according to the output of the integrating memory part 7.

Figure 4:
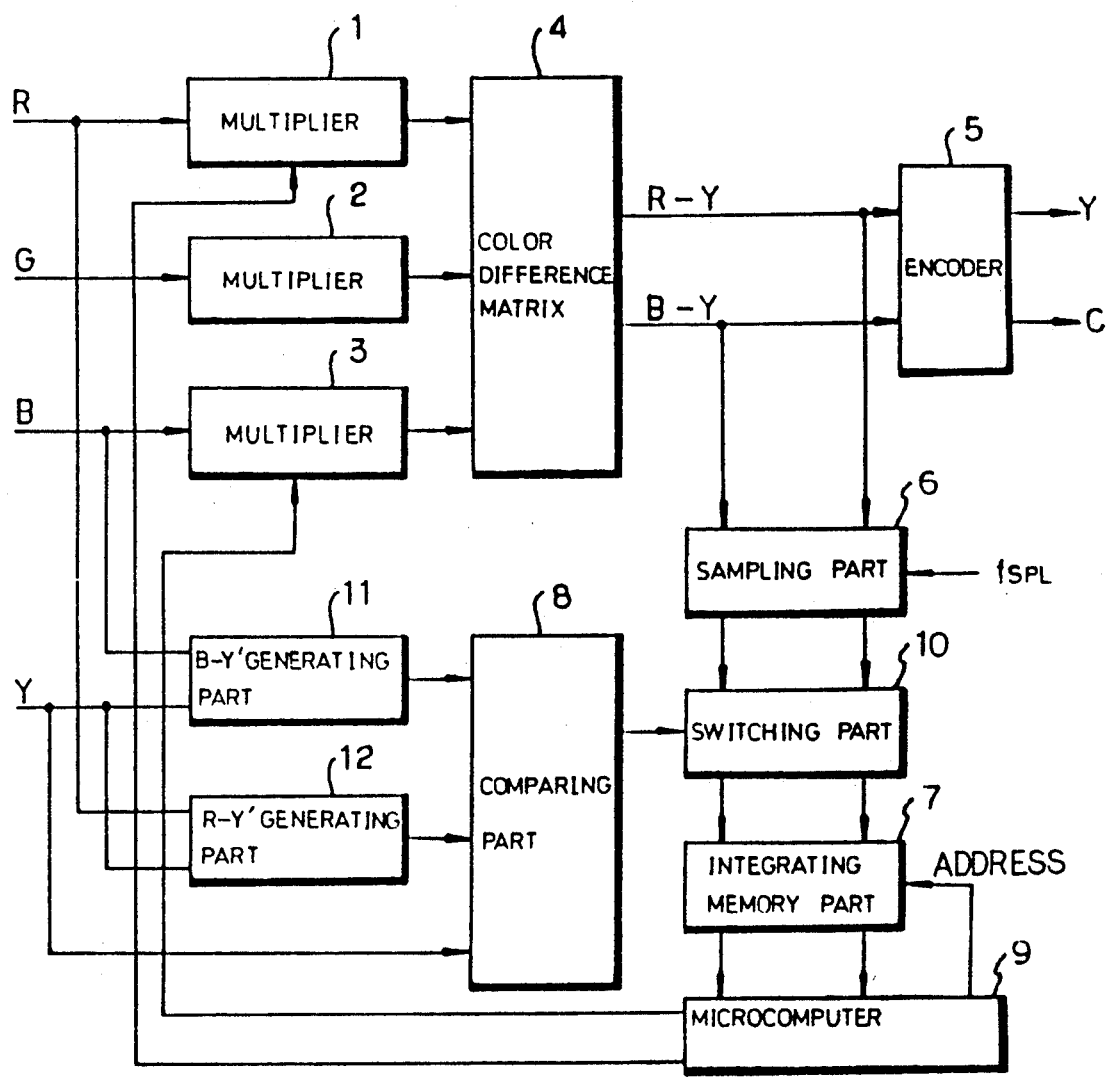
FIG. 4 illustrates a comparing part of a preferred embodiment of the circuit according to the present invention.

FIG. 4 is a detailed view of an embodiment of the circuit in FIG. 3 and comprises a R−Y' generating part 12 and a B−Y' generating part 11 for generating R−Y' signals and B−Y' signals respectively after mixing and amplifying the Y luminance signal and the separated R,B color signals, a comparing part 8 for comparing the R−Y', B−Y' color difference signals from the R−Y' generating part 12 and the B−Y' generating part 11 whether the R−Y' and B−Y' color difference signals are included in the white balance region, and a switching part 10 for applying the integrating memory part 7 with the data sampled in the sampling part 6 by being driven according to the decided signal of the comparing part 8.

Figure 5:
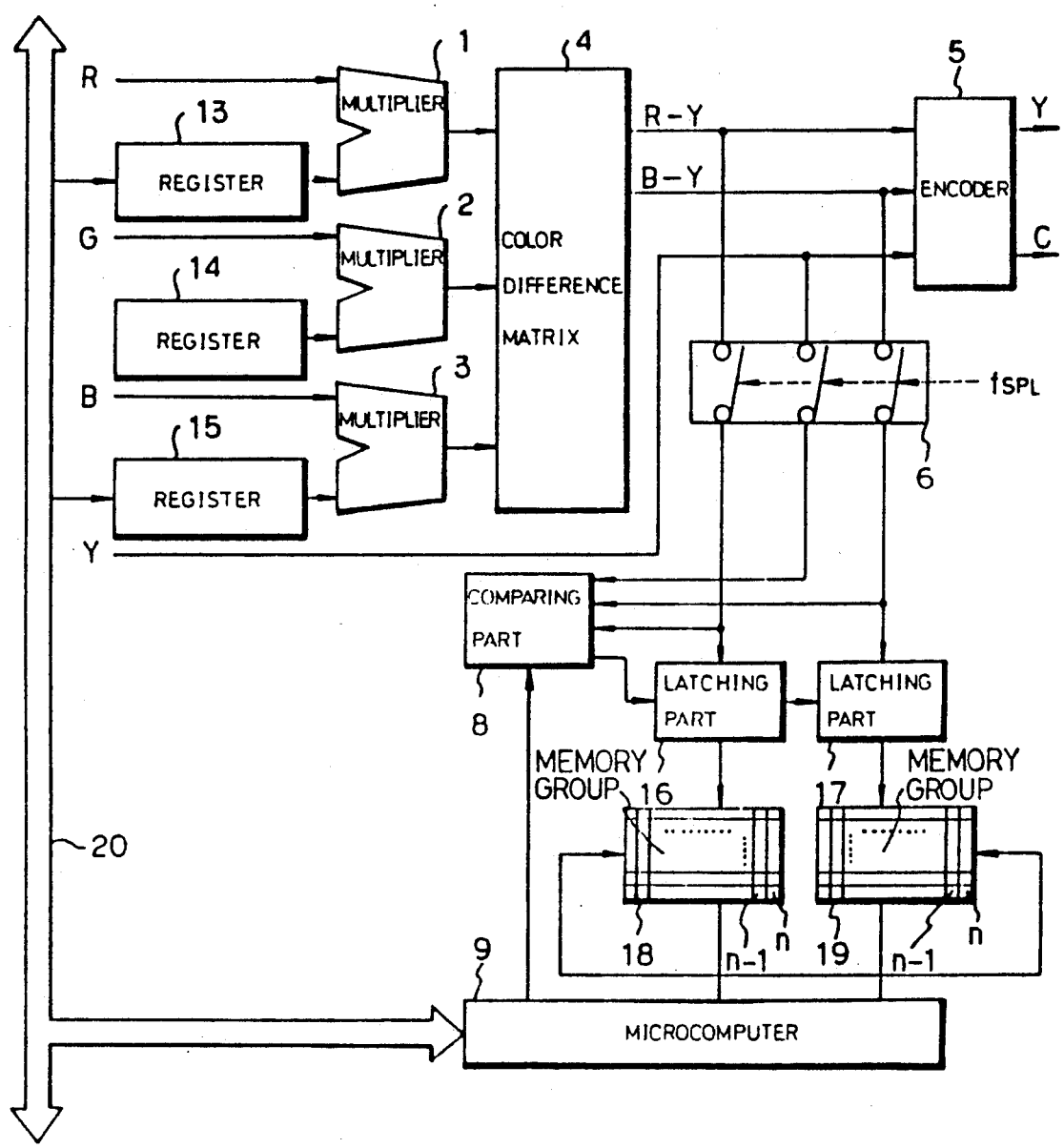
FIG. 5 illustrates another embodiment of the circuit according to the present invention.
Figure 6:
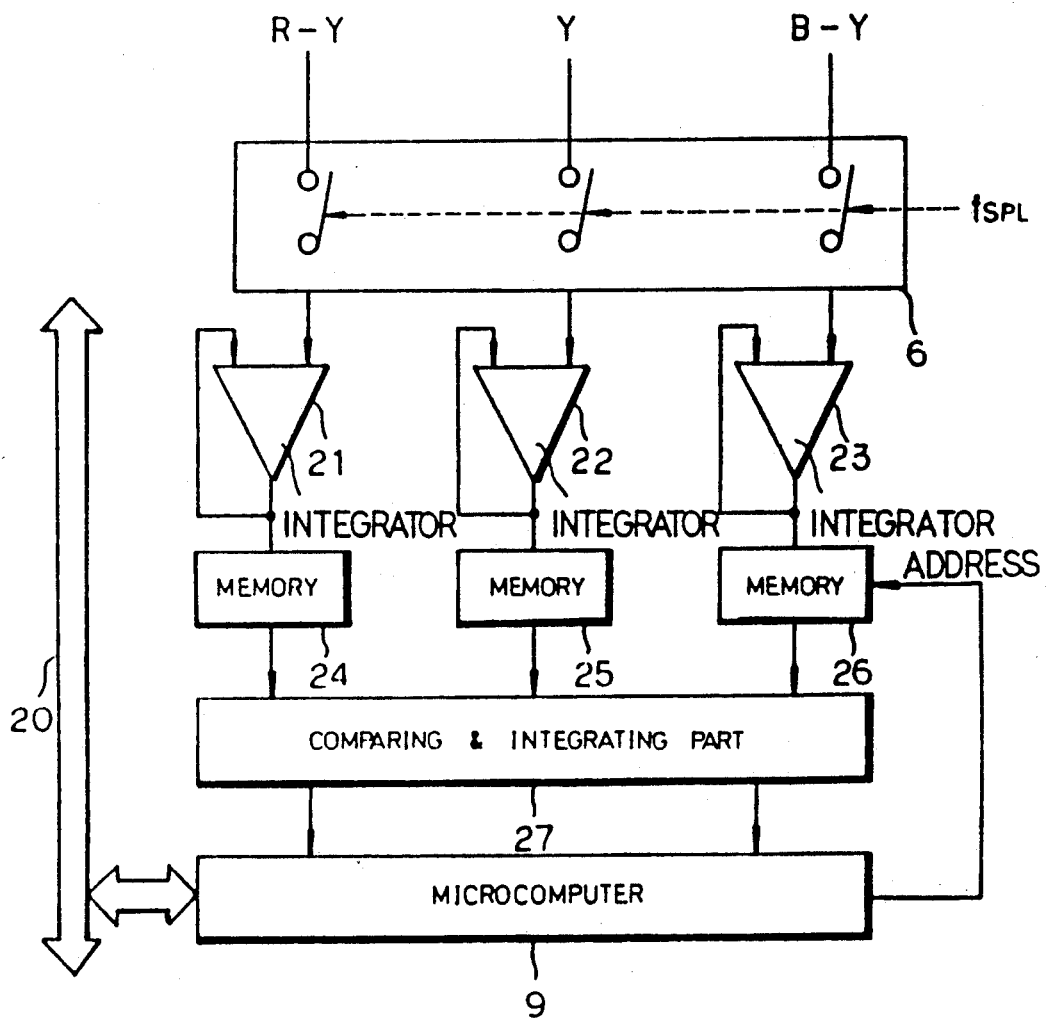
FIG. 6 illustrates still another embodiment of the circuit according to the present invention.

The circuit of another embodiment of the present invention as shown in FIG. 5 comprises a comparing part 8 for deciding whether the Y luminance signal and the sampled R−Y, B−Y color difference signals of the sampling part 6 are includes in the white balance adjusting region, latching parts 16,17 responsive to the decided signals of the comparing part 8, for integrating and passing only data included in the white balance adjusting region, memories 18,19 for storing the passed data from the latching parts 16,17 in accordance with the picture division, and a MICOM 9 for generating the white balance adjusting multiplying coefficients to multiplier registers 13,14,15, after reading and computing of the stored data from the memories 18,19 in the designated addresses:

FIG. 6 is still another embodiment of the circuit shown in FIG. 5, wherein the circuit comprises integrators 21,22,23 for integrating the respective data of the R−Y, B−Y signals sampled in the sampling part 6, memories 24,25,26 for storing the output data from the integrators 21,22,23 corresponding to N divisions of a picture, and a comparing and integrating part 27 for summing up and transferring the divided data to the MICOM 9 by comparing the data and deciding whether the data is included in the white balance adjusting region after reading out the stored data in the memories 24,25,26 according to addresses designated by the MICOM 9.

In the drawings, a reference number 20 indicates an internal bus.

The automatic digital white-balancing circuit according to the present invention will be described in more detail.

FIG. 1 is a graph showing the color-temperature track and the white detecting region by comparing the R−Y and B−Y color difference signals. The camera can not discriminate colors in the same way as human eyes, and for this reason a white level must be divided by the color difference signals.

As shown in the graphical illustration of FIG. 1, it is assumed that y axis represents a R−Y color difference level and x axis represents a B−Y color difference level. The white balance level is varied depending on the standard (to be called "illumination" below) for illuminating an object. The illumination turns red as the temperature drops and turns blue as the temperature rises. Further, if it is assumed that the standard of the pure white lies at 0 point where the y and x axes intersect each other, a low color temperature illumination exists a second quadrant, and a high color temperature illumination exists within a fourth quadrant.

For example, in the case with a fluorescent lamp, light from the sun and a halogen lamp is used to illuminate an object, the color temperatures lie at the points K1,K2,K3, respectively. In order to make the respective illuminations white, the color temperature is put in "0" state. Further, when the respective color temperature points are connected one another, the color temperature track in the form of a curve is obtained.

In order to select a white detection region covering the above color temperature track, if the range a,−a of the R−Y color difference signals is arbitrarily decided on the y axis, and if the range b,−b of the B−Y color difference signals is also arbitrarily decided on the x axis, the white detecting region is obtained as shown by a shaded area. The absolute value of the R−Y color difference signals must be smaller than or equal to that of an arbitrarily set constant ($|R-Y| \leq a$ ... (A): where a is a positive integer), and the absolute value of the B−Y color difference signals must be smaller than or equal to that of an arbitrarily set constant ($|B-Y| \leq b$ ... (B): where b is a positive integer).

Therefore, if it is assumed that the sum of the two positive integers a,b is c, then an equation of ($|R-Y| + |B-Y| \leq c$ ... (C) has to be satisfied, requiring the sum of the absolute value of the R−Y color difference signals and that of the B−Y color difference signals to be smaller than or equal to an arbitrarily set value c, where C a positive integer.

Meanwhile, if the signals are to satisfy the formulas (A), (B) and (C), when the illuminance is too low, the Y luminance signal must satisfy the following conditions in order to sense the white level. As shown in FIG. 2, the signals have to be within the range between the uppermost and lowermost levels (YGATE MIN≦Y≦YGATE MAX ... (D)). Further, the maximum level (YGATE MAX) must be set larger than 100 percent white and equal to or smaller than the set level of an internal white clip of the camera (100 white<YGATE MAX≦YWHITE CLIP ... (E)). Meanwhile, the minimum level (YGATE MIN) of the luminance signal come between 0 percent level and 100 percent of the level. (0 LEVEL≦YGATE MIN≦100% WHITE ... (F)).

Now, the operation of the present invention is based on the assumption that formulas (A) to (F) are programmed in the MICOM 9 and set as reference data in the comparing part 8.

The R,G,B signals which are picked up by the video camera and converted into the digital signals are applied to the multipliers 1,2,3 to be multiplied according to the multiplying coefficients and applied to the color difference matrix 4.

The multiplier 2 to which the G signal is applied has a fixed multiplying coefficient. The multipliers 1,3 to which the R,B signals are applied have variable multiplying coefficients according to the data applied to the MICOM 9. Therefore, the white balance can be adjusted by varying the multiplying coefficients of the multipliers 1,3.

Meanwhile, the outputs from the multipliers 1,2,3 are applied to the color difference matrix 4, and the color difference matrix 4 outputs the R−Y and B−Y color difference signals to the encoder 5. The encoder 5 receives the Y luminance signal to encode and provide final Y luminance signal and C signal, so as to fully express particular colors of a picture.

The output R−Y and B−Y color difference signals from the color difference matrix 4 and the input Y luminance signal are applied to the sampling part 6 to be read by the proper sampling frequency fSPL and subjected to integration in order to sum up the sampled data. Then, they are stored into the relevant addresses of the memory and transmitted to the comparing part 8 at the same time.

Meanwhile, the comparing part 8 receives the output data from the integrating memory part 7 to decide whether the divided data is included in the luminance signal reference level and the detecting region of FIGS. 1 and 2 according to the formulas (A)-(F). The decided signals are applied to the MICOM 9 to designate addresses within the integrating memory part 7 by a MICOM rule applied thereon, so that the integrating memory part 7 apply the integrated data of the R−Y and B−Y color difference signals to the MICOM 9.

Accordingly, the MICOM 9 compares the output R−Y integrated data with the B−Y integrated data from the integrating memory part 7. In order to achieve the white balance, the MICOM 9 outputs the multiplying coefficients to the multipliers 1,3 to satisfy the formulas of $|R-Y|=0$ ... (G) and $|B-Y|=0$ ... (H).

In the circuit of the present invention operating as described above, the R,G,B signals are applied through the multipliers 1,2,3 to the color difference matrix 4, and the R−Y and B−Y color difference signals are applied to the encoder 5. Then, the signals are sampled by the sampling part 6 to the proper sampling frequency fSPL and integrated by the integrating memory part 7 to be recorded into the respective addresses of the memory corresponding to the division of the picture. The comparing part 8 decides whether the integrated and divided data is included in the white detecting region of FIGS. 1 and 2, and the decided signals are applied to the MICOM 9. The MICOM 9 designates the proper addresses so that the integrated data of the R−Y and B−Y color difference signals can be applied and also the multiplying coefficients of the multipliers 1,3 can be adjusted to satisfy the formulas of R−Y=0 and B−Y=0. By repeating the operation, the automatic adjusting of the white balance is achieved to process the digital signals in the video camera.

FIG. 4 illustrates another embodiment of the comparing part 8 according to the present invention. In FIG. 3, the comparing part 8 operates in such a manner that the white balance is adjusted by the multipliers 1,2,3, the output R−Y and B−Y color difference signals from the color difference matrix 4 are sampled in the sampling part 6, integrated and divided by the integrating memory part 7 so that the divided data can be compared by the comparing part 8. In FIG. 4, the R,B luminance signal are mixed with the Y signals and amplified by the B−Y' generating part 11 and the R−Y' generating part 12 before being color-separated and subjected to the white balance adjustments. Thus, the R−Y' and color difference B−Y' signals and the Y luminance signals are compared with one another and evaluated. Thus, the switching part 10 is controlled when they are in the regions of FIGS. 1 and 2, satisfying the formulas (A)-(F) so that the R−Y and B−Y color difference signals sampled in the sampling part 6 according to the sampling frequency fSPL are selectively applied to the integrating memory part 7, and stored into the memory corresponding to the picture division. The MICOM 9 designates the addresses in the integrating memory part 7 and receives the integrated R−Y and B−Y data in order to compute, compare, and evaluate. Then, the MICOM 9 outputs the multiplying coefficients of the multipliers 1,3 to satisfy formulas (G) and (H) for completing the adjustment of the white balance.

On the other hand, according to FIG. 3, the signals are inputted after the white balance adjustment according to the decided signals of the comparing part 8. In FIG. 4, the R−Y' and B−Y' signals are applied before the white balance adjustment so that the white detecting region of the color temperature track remains to be equal regardless of the value of the multiplying coefficient from the MICOM 9 and the comparing signal level is kept constant without variation. Consequently, the comparison can stably be carried out.

Referring to FIG. 5, the output Y luminance signal and the R−Y and B−Y color difference signals from the color difference matrix 4 from the sampling of the color difference signals to the inputting into the MICOM 9 are applied to both the encoder 5 and the sampling part 6 to be sampled by the proper sampling frequency fSPL. Then, the signals are temporarily stored into the latching parts 16,17 and applied to the comparing part 8.

Therefore, if it is found that the formulas (A)-(F) are satisfied by the sampled input data from the sampling part 6, the comparing part 8 activates the latching parts 16,17 to be integrated and the integrated data is stored into the memory groups 18,19 corresponding to the division of the picture.

Here, two memory groups 18,19 are required for R−Y data and another one for B−Y data and each of the memory groups 18,19 has picture-divided storing places in the number of n.

The data stored in the memory groups 18,19 are read by the address stored by the MICOM 9 and applied to the MICOM 9. The MICOM 9 carries out comparisons, evaluations and computations on the data to output the multiplying coefficients for satisfying these formulas (G) and (H). The multiplying coefficients from the MICOM 9 are applied through the internal bus 20 to the multiplying coefficient registers 13,14,15 of the multipliers 1,3 for adjusting the white balance.

Here, the addresses in the memory groups 18,19 are designated by the programs stored in the MICOM 9. For example, the upper portion of the picture is usually the sky or some background scenes, and therefore, the address is designated based on a certain rule that a certain amount is shielded in order to prevent errors on the white balance. Further, the picture may be divided and a certain weighted value can be assigned, or the fuzzy rule may be applied to perform the picture division.

Meanwhile, FIG. 6 is still another embodiment of the portion of the circuit of FIG. 5, corresponding to the portion from the sampling of the R−Y and B−Y luminance signal and the Y signals. The R−Y and B−Y signals are sampled by a sampling part 6 based on the sampling frequency fSPL, and the sampled data is integrated by the respective integrators 21,22,23 to be applied to picture-divided n memories 24,25,26.

The data stored in the memories 24,25,26 is read in accordance with the rule-applied address designation by the MICOM 9. The data is applied to the comparing and integrating part 27 and the R−Y and B−Y data including the regions of FIGS. 1 and 2 and satisfying the formulas (A)-(F) are integrated and applied to the MICOM 9.

Then, the MICOM 9 carries out comparison, evaluation, and computation on the output R−Y and B−Y data from the comparing and integrating part 27 to provide the multiplying coefficients satisfying the formulas (G) and (H) through the internal bus 20 for adjusting the white balance.

Thus, the automatic white-balancing circuit according to the present invention comprises a sampling part coupled to receive the separated R,G,B signals, for sampling the Y signals and the R−Y and B−Y color difference signals of the color difference matrix according to a proper sampling frequency, an integrating memory part for integrating the data sampled by the sampling part and summing up and storing the data corresponding to the picture, a comparing part for deciding whether the integrated data of the integrating memory part is included in a white balance adjusting region, and a microprocessor coupled to receive the output data from the comparing part, for designating the addresses for the integrating memory part by the MICOM and for enabling integration and computation of the integrated data to output the multiplying coefficient to the multiplier, thereby enabling the adjustment of a white balance.

Thus, there is provided an automatic white-balancing circuit for a video camera for processing digital signals. Therefore, the white balance of a digital video camera can be automatically adjusted, thereby completely digitalizing the video camera.

What is claimed is:
1. An automatic white balance circuit, comprising:
   means for receiving video signals comprised of a luminance signal and color signals representative of a red color signal, a green color signal and a blue color signal;

multiplier means for multiplying selected ones of said color signals with corresponding ones of multiplying coefficients;

matrix means for generating first color-difference signals in dependence upon the outputs of said multiplier means;

encoder means for encoding said luminance signal and said first color-difference signals;

sampling means for sampling said first color-difference signals in dependence upon a sampling frequency to provide sampled signals;

means for generating second color-difference signals by combining said selected ones of said color signals with said luminance signal;

means for determining whether said second color-difference signals are in a white balance adjusting region to provide a balance enable signal;

integrating memory means for integrating the sampled signals in dependence upon said balance enable signal, and storing the integrated signals in accordance with designated addresses; and processor means coupled to receive said integrated signals and said balance enable signal, for providing said designated addresses and said multiplying coefficients to control white balance of said video signals.

2. The automatic white balance circuit as claimed in claim 1, wherein said color signals and said luminance signal are digital signals.

3. An automatic white balance circuit, comprising:

means for receiving a luminance signal and color signals representative of a red color signal, a green color signal and a blue color signal;

multiplier means for multiplying said color signals in dependence upon a plurality of multiplying coefficients;

matrix means for providing R−Y and B−Y color difference signals in dependence upon the outputs of said multiplier means;

encoder means for encoding said luminance signal and said R−Y and B−Y color difference signals;

sampling means for sampling said R−Y and B−Y color difference signals in dependence upon a sampling frequency to provide sampled signals;

comparing means for determining whether said R−Y and B−Y color signals are in a white balance adjusting region to provide a balance enable signal;

latching means for latching said sampled signals from said sampling means in dependence upon said balance enable signal to provide latched signals;

plural memory means having a plurality of addresses, for storing said latched signals at designated addresses in dependence upon a number of divisions of an image; and processor means for generating said plurality of multiplying coefficients to control white balance of said image in dependence upon a reading of the latched signals stored in said designated addresses of said plural memory means, said processor means designating addresses of said plural memory means.

4. The automatic white balance circuit as claimed in claim 3, wherein said color signals and said luminance signal are digital signals.

5. An automatic white balance circuit, comprising:

means for receiving a luminance signal and color signals representative of a red color signal, a green color signal and a blue color signal;

multiplier means for multiplying said color signals in dependence upon a plurality of multiplying coefficients;

matrix means for providing R−Y and B−Y color difference signals in dependence upon the outputs of said multiplier means;

encoder means for encoding said luminance signal and said R−Y and B−Y color difference signals;

sampling means for sampling said R−Y and B−Y color difference signals in dependence upon a sampling frequency to provide sampled signals;

a plurality of integrators for integrating said sampled signals to provide integrated signals;

a plurality of memories for storing said integrated signals corresponding to a number of divisions of an image;

means for providing white balance adjusting signals by reading the stored signals from said plurality of memories in designated addresses, and determining whether the read signals are in a white balance adjusting region; and processor means for generating said designated addresses for said plurality of memories, and for generating said plurality of multiplying coefficients to control white balance of said image in dependence upon reception of said white balance adjusting signals.

6. An automatic white balance circuit, comprising:

means for receiving video signals comprised of a luminance signal and color signals;

multiplier means for multiplying selected colors of said color signals with corresponding ones of white balance control coefficients to provide multiplied color signals;

matrix means for providing color-difference signals in dependence upon said multiplied color signals;

encoder means for encoding said luminance signal and said color-difference signals to provide white balance luminance and chrominance signals; and white balance controller means for automatically controlling white balance of said video signals in dependence upon an illumination condition of an illuminating object by determining whether said color-difference signals and said luminance signal are in a white balance adjusting region to provide said white balance control coefficients, said white balance controller means comprising:

sampling means for sampling said color-difference signals in dependence upon a sampling clock frequency to provide sampled signals;

first generating means for generating a first color-difference signal in dependence upon reception of a first color of said color signals and said luminance signal;

second generating means for generating a second color-difference signal in dependence upon reception of a second color of said color signals and said luminance signal;

comparing means for comparing said first and second color-difference signals and said luminance signal to provide a compared signal;

switching means for enabling transmission of said sampled signals in dependence upon said compared signal to provide transmitted sampling signals;

means for integrating said transmitted sampling signals to provide integrated signals, and for storing said integrated signals in designated addresses; and processor means for providing said designated addresses and said white balance control coefficients in dependence upon reception of said integrated signals.

7. The automatic white balance circuit as claimed in claim 6, wherein said luminance signal and said color signals representative of said red color signal, said green color signal and said blue color signal are digital signals.

8. An automatic white balance circuit, comprising:

means for receiving video signals comprised of a luminance signal and color signals;

multiplier means for multiplying selected colors of said color signals with corresponding ones of white balance control coefficients to provide multiplied color signals;

matrix means for providing color-difference signals in dependence upon said multiplied color signals;

encoder means for encoding said luminance signal and said color-difference signals to provide white balance luminance and chrominance signals; and white balance controller means for automatically controlling white balance of said video signals in dependence upon an illumination condition of an illuminating object by determining whether said color-difference signals and said luminance signal are in a white balance adjusting region to provide said white balance control coefficients, said white balance controller means comprising:

sampling means for sampling said color-difference signals and said luminance signal in dependence upon a sampling clock frequency to provide corresponding sampled color-difference signals and sampled luminance signal;

comparing means for comparing said sampled color-difference signals and said sampled luminance signal to provide a latching signal in dependence upon a control signal;

latch means for temporarily storing said sampled color-difference signals, and for latching the stored sampled color-difference signals in dependence upon said latching signal;

integrating means for integrating the latched color-difference signals to provide corresponding integrated color-difference signals;

memory means having first and second memory groups for storing each of corresponding components of said integrated color-difference signals in designated addresses; and processor means for providing said designated addresses, said control signal and said white balance control coefficients via a plurality of registers in dependence upon reception of the stored integrated color-difference signals.

9. The automatic white balance circuit as claimed in claim 8, wherein said luminance signal and said color signals representative of said red color signal, said green color signal and said blue color signal are digital signals.

10. A method for automatically controlling a white balance of video signals, comprising the steps of:

receiving said video signals comprised of a luminance signal and color signals;

multiplying selected colors of said color signals with corresponding ones of white balance control coefficients to provide multiplied color signals;

differentiating each of said multiplied color signals to provide first and second color-difference signals;

encoding said luminance signal and said first and second color-difference signals to provide white balance luminance and chrominance signals; and automatically controlling white balance of said video signals in dependence upon an illumination condition of an illuminating object by determining whether said color-difference signals and said luminance signal are in a white balance adjusting region to provide said white balance control coefficients, wherein said white balance controlling step further comprises the steps of:

sampling said first and second color-difference signals in dependence upon a sampling clock frequency to provide sampled signals;

generating a third color-difference signal in dependence upon reception of a first color of said color signals and said luminance signal, and a fourth color-difference signal in dependence upon reception of a second color of said color signals and said luminance signal;

comparing said third and fourth color-difference signals and said luminance signal to provide a compared signal;

enabling transmission of said sampled signals in dependence upon said compared signal to provide transmitted sampling signals;

integrating said transmitted sampling signals to provide integrated signals, and for storing said integrated signals in designated addresses of a memory; and generating said designated addresses and said white balance control coefficients in dependence upon reception of said integrated signals.

11. A method for automatically controlling a white balance of video signals, comprising:

receiving said video signals comprised of a luminance signal and color signals;

multiplying selected colors of said color signals with corresponding ones of white balance control coefficients to provide multiplied color signals;

differentiating each of said multiplied color signals to provide first and second color-difference signals;

encoding said luminance signal and said first and second color-difference signals to provide white balance luminance and chrominance signals; and automatically controlling white balance of said video signals in dependence upon an illumination condition of an illuminating object by determining whether said color-difference signals and said luminance signal are in a white balance adjusting region to provide said white balance control coefficients, wherein said white balance controlling step further comprises the steps of:

sampling said first and second color-difference signals and said luminance signal in dependence upon a sampling clock frequency to provide corresponding first and second sampled color-difference signals and a sampled luminance signal;

comparing said first and second sampled color-difference signals and said sampled luminance signal to provide a latching signal in dependence upon a control signal;

temporarily storing said first and second sampled color-difference signals for latching the stored first and second sampled color-difference signals in dependence upon said latching signal;

integrating the first and second latched color-difference signals to provide corresponding first and second integrated color-difference signals;

storing said first and second integrated color-difference signals in designated addresses of a plurality of memories; and generating said designated addresses, said control signal and said white balance control coefficients via a plurality of registers in dependence upon reception of the stored integrated color-difference signals.

12. An automatic white balance circuit, comprising:

means for receiving video signals comprised of chrominance signals and luminance signals;

means for adjusting selected color components of said chrominance signals with corresponding ones of white balance control coefficients to provide adjusted chrominance signals;

means for providing color-difference signals in dependence upon said adjusted chrominance signals; and white balance controller means for automatically controlling white balance of said video signals in dependence upon illumination condition of an object by determining whether said color-difference signals and said luminance signals are in a white balance adjusting region to provide said white balance control coefficients, said white balance controller means comprising:

sampling means for sampling said luminance signals and said color-difference signals in dependence upon a sampling clock to provide sampled signals;

means for integrating said sampled signals to provide integrated signals, and for storing said integrated signals in designated addresses of a memory;

means for determining whether the stored integrated signals in designated addresses of said memory are in said white balance adjusting region to provide a white balance enabling signal; and processor means for providing said designated addresses and said white balance control coefficients in dependence upon said white balance enabling signal.

13. An automatic white balance circuit, comprising:

means for receiving video signals comprised of chrominance signals and luminance signals;

means for adjusting selected color components of said chrominance signals with corresponding ones of white balance control coefficients to provide adjusted chrominance signals;

means for providing color-difference signals in dependence upon said adjusted chrominance signals; and white balance controller means for automatically controlling white balance of said video signals in dependence upon illumination condition of an object by determining whether said color-difference signals and said luminance signals are in a white balance adjusting region to provide said white balance control coefficients, said white balance controller means comprising:

sampling means for sampling said color-difference signals and said luminance signals in dependence upon a sampling clock to provide corresponding sampled color-difference and luminance signals;

a plurality of integrators for integrating said sampled color-difference and luminance signals to provide integrated color-difference and luminance signals;

a plurality of memories having designated addresses, for storing said integrated color-difference and luminance signals in said designated addresses;

means for comparing the stored integrated color-difference and luminance signals to provide compared signals; and processor means for selecting said designated addresses and for producing said white balance control coefficients via a plurality of registers in dependence upon reception of said compared signals.

14. An automatic white balance circuit, comprising:

means for receiving video signals comprised of chrominance signals and luminance signals;

means for adjusting selected color components of said chrominance signals with corresponding ones of white balance control coefficients to provide a plurality adjusted chrominance signals;

means for providing color-difference signals in dependence upon said adjusted chrominance signals; and white balance controller means for automatically controlling white balance of said video signals in dependence upon illumination condition of an object by determining whether said color-difference signals and said luminance signals are in a white balance adjusting region to provide said white balance control coefficients, said white balance controller means comprising:

sampling means for sampling said color-difference signals and said luminance signals in dependence upon a sampling clock to provide sampled color-difference and luminance signals;

comparing means for comparing said sampled color-difference and luminance signals to provide a latching signal in dependence upon a control signal;

means for temporarily storing said sampled color-difference signals, and latching the stored sampled color-difference signals in dependence upon said latching signal, and for integrating the latched color-difference signals to provide corresponding integrated color-difference signals;

memory means having first and second memory groups with designated addresses, for storing each of corresponding components of said integrated color-difference signals in said designated addresses; and processor means for selecting said designated addresses, and for producing said control signal and said white balance control coefficients via a plurality of registers in dependence upon reception of the stored integrated color-difference signals.

* * * * *

UNITED STATES PATENT AND TRADEMARK OFFICE
CERTIFICATE OF CORRECTION

PATENT NO.   :   5,298,979
DATED        :   29 March 1994
INVENTOR(S)  :   Sung Hoon KIM It is certified that error appears in the above-indentified patent and that said Letters Patent is hereby corrected as shown below:   TITLE PAGE

Bracket [75], inventor's name,    "Sung H. Kim" to --Sung Hoon Kim--;

Column 3,    line 37,    after "exists", insert --within--;

Column 4,    line 35,    change "C" to --a final C chrominance--

Column 6, line 25,    after "on", change "the" to -- a --; change "a" to --the--.

line 36,    preceeding "comparison", insert --the--:

Signed and Sealed this

Fifteenth Day of October, 1996

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,298,979

DATED : March 29, 1994

INVENTOR(S) : Sung Hoon Kim

It is certified that error appears in the above-identified patent and that said Letters Patent is hereby corrected as shown below:

On the Title page, item [75] change inventor's name "Sung H. Kim" to

-- Sung Hoon Kim --.

Signed and Sealed this

Fifth Day of November, 1996

Attest:

BRUCE LEHMAN

Attesting Officer        *Commissioner of Patents and Trademarks*